United States Patent
Niikawa

(10) Patent No.: US 6,710,809 B1
(45) Date of Patent: Mar. 23, 2004

(54) BATTERY-DRIVEN ELECTRIC EQUIPMENT

(75) Inventor: Masahito Niikawa, Hachioji (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/513,445

(22) Filed: Feb. 25, 2000

(30) Foreign Application Priority Data

Feb. 26, 1999 (JP) .......................................... 11-051489

(51) Int. Cl.[7] ........................ H04N 5/225; H04N 5/222; H04B 1/38
(52) U.S. Cl. ............. 348/372; 348/333.01; 348/333.04; 455/574; 455/343.5
(58) Field of Search .................. 348/372, 376, 348/333.04, 333.13, 333.01; 455/574, 343.5

(56) References Cited

U.S. PATENT DOCUMENTS

| | | | | |
|---|---|---|---|---|
| 5,323,203 A | * | 6/1994 | Maruyama et al. | ............ 396/57 |
| 5,369,460 A | | 11/1994 | Taniguchi et al. | ........... 354/400 |
| 5,949,484 A | * | 9/1999 | Nakaya et al. | ............ 348/384.1 |
| 5,963,255 A | * | 10/1999 | Anderson et al. | ............ 348/372 |
| 6,233,016 B1 | * | 5/2001 | Anderson et al. | ............ 348/372 |
| 6,362,851 B1 | * | 3/2002 | Lavelle et al. | ......... 348/333.01 |
| 6,501,968 B1 | * | 12/2002 | Ichimura | ..................... 455/574 |
| 6,580,460 B1 | * | 6/2003 | Takahashi et al. | ........... 348/372 |
| 2001/0008424 A1 | * | 7/2001 | Higuchi et al. | .............. 348/372 |

FOREIGN PATENT DOCUMENTS

| | | |
|---|---|---|
| JP | 59-136622 U | 9/1984 |
| JP | 61-16630 U | 1/1986 |
| JP | 3-38970 U | 4/1991 |
| JP | 04-085509 A | 3/1992 |
| JP | 09-130649 A | 5/1997 |
| JP | 10-239749 A | 9/1998 |

* cited by examiner

Primary Examiner—Wendy R. Garber
Assistant Examiner—Lin Ye
(74) Attorney, Agent, or Firm—Sidley Austin Brown & Wood LLP

(57) ABSTRACT

A battery-driven electric equipment includes a detector for detecting a voltage of the battery and a calculator for calculating an available photographing number based on the voltage detected by the detector. The available photographing number calculated by the calculator is displayed by an indicator.

17 Claims, 9 Drawing Sheets

BATTERY-DRIVEN ELECTRIC EQUIPMENT

The present invention claims a priority based on the Japanese Patent Application No. H11-51489, the contents of which is incorporated hereinto by reference in its entirety.

BACKGROUND OF THE INVENTION

1. Field of the Invention

This invention relates to a digital camera.

2. Description of Related Art

In a portable battery-driven electric equipment such as a digital camera, the internal resistance of the battery increases gradually in accordance with the use of the equipment, and it becomes impossible to supply necessary power to the equipment when the internal resistance increases to a certain level. A user wishes to use the battery as long as possible. However, a large voltage drop causes an unstable operation of the equipment. Therefore, in a conventional electric equipment, a warning display system and/or a forcible power turn-off process (a battery check process) are employed. For example, Japanese Unexamined Laid-open Patent Publication H9(1997)-130649 discloses an electric still camera in which a voltage drop is detected to display warning and the power is automatically turned off.

Furthermore, in the aforementioned Patent Publication H9-130649, in a case where the equipment has a plurality of operation modes, since the load depends on the mode, different voltages to be subjected to the battery check process are set depending on the mode. According to the aforementioned publication, in a moving image mode the battery check level is set to be higher, while in a still image mode the battery check level is set to be lower.

However, in a conventional digital camera mentioned above, when the battery is consumed, a user cannot recognize a remaining available photographing number, resulting in a poor operability.

In addition, the aforementioned digital camera still includes various problems to be solved regarding how to fully consume the battery effectively.

First, no control considering a battery discharging characteristic has been considered. FIG. 12 illustrates a discharge characteristic of an alkali-manganese battery for use in a portable electric equipment such as a digital camera. In a state that a load is connected to a terminal, the initial terminal voltage is 6.0 V(volt) (when four batteries are connected in series). The terminal voltage decreases along the curve V(t) with time when continuously discharged by connecting to the load. In this embodiment, since the battery check voltage Vth is set to be 3.8 V, the power supply to the equipment is turned off at the timing (time t4) of V(t)=3.8 V.

However, in the course the voltage drop, when there is a power-off time period T caused by a power-off operation by a user or an automatic power-off function, the electromotive force of the battery is restored. In a case where the terminal voltage is V1 at the time immediately before turning off the power, the electromotive force is restored to V2 when the power is turned on immediately after the power-off time period T. However, the voltage suddenly drops to the terminal voltage V1 as shown in the curve V' (t). Thereafter, the voltage drops along the curve V(t−T) parallel to the curve V(t), delaying by the power-off time period T. At the time of t4+T, the voltage V(t−T) comes equal to the voltage Vth and the power is turned off based on the battery check.

As understood from the above, in actual, a portable electric equipment such as a digital camera is used by repeatedly turning on and off, and it can be said that the battery is completely consumed only when the maximum terminal voltage Vth at the time of turning on the power comes to Vth. However, this is not considered by the aforementioned Patent Publication.

As shown in FIG. 12, when a consumed battery is used, since the voltage suddenly drops, the use of the apparatus will be restricted. According to the aforementioned Publication, it merely discloses that a moving mode is prohibited and a still mode is allowed. However, in a case of a digital camera, there are various restrictions regarding, for example, the number of photographing, the use of a flash lamp, turning on/off the monitor display (view finder display), the relationship between the reproduction mode and the photographing mode, the use of automatic focusing mechanism, the execution of the automatic power turn-off process for automatically turning off the power when an operation has not been performed for a predetermined time period, and the execution of an automatic video turn-off process for automatically turning off the power supply to a video circuit or a display circuit of a digital camera. In other words, the battery life depends on how to execute these processing. Therefore, in order to lengthen the battery life, the relationship between the battery voltage and the aforementioned operations should be considered.

SUMMARY OF THE INVENTION

It is an object of the present invention to provide an electric equipment including a digital camera in which a battery can be effectively consumed while keeping the battery life as long as possible.

It is another object of the present invention to provide an is electric equipment in which a battery life can be kept long without lowering an operability of the electric equipment.

According to a first aspect of the present invention, a battery-driven electric equipment includes a detector for detecting a voltage of the battery, a calculator for calculating an available photographing number based on the voltage detected by the detector, and an indicator for indicating the available photographing number calculated by the calculator.

With this electric equipment, since the available photographing number is set and displayed on a display portion based on the voltage of the battery detected by the detector, a user can recognize how many photographs can be taken by the camera without lowering the operability even if the voltage of the battery drops.

Furthermore, since the available photographing number is displayed, a user's positive power saving operation by positively turning off the power can be expected, resulting in an enhanced power saving of the battery and a lengthened battery life.

According to a second aspect of the present invention, a battery-driven electric equipment includes a detector for detecting a voltage of the battery, a manipulation member, a discrimination unit for discriminating whether or not the manipulation member has not been manipulated for a predetermined time period, and a controller for suspending a power supply from the battery when the discrimination unit discriminates that the manipulation member has not been manipulated for the predetermined time period, wherein the controller changes the predetermined time period based on the voltage detected by the detector.

With this electric equipment, in a case where the voltage of the battery drops, wasteful power consumption can be prevented by shortening the predetermined time period causing the power turn-off, resulting in a lengthened battery life.

According to a third aspect of the present invention, a battery-driven electric equipment includes a detector for detecting a voltage of the battery, a plurality of operation modes including at least a reproduction mode for reproducing a recorded image, a selector for selecting any one of the plurality of operation modes, and a controller for controlling a selection of the reproduction mode by the selector based on the voltage detected by the detector.

With this electric equipment, in a case where the voltage of the battery drops, it is possible to prohibit the use of the reproduction mode, resulting in decreased power consumption.

According to a fourth aspect of the present invention, a battery-driven electric equipment includes a detector for detecting a voltage of the battery, a flash lamp for lightening up an object, and a controller for controlling a use of the flash lamp based on the voltage detected by the detector.

With this electric equipment, in a case where the voltage of the battery drops, it is possible to prohibit the use of the flash lamp, resulting in decreased power consumption.

According to a fifth aspect of the present invention, a battery-driven electric equipment includes a detector for detecting a voltage of the battery, a calculator for calculating a remaining available operation time period of the electric equipment based on the voltage detected by the detector, and an indicator for indicating the available operation time period calculated by the calculator.

With this electric equipment, since the available operation time period is displayed, it is possible for a user to recognize how long the electric equipment can be used. Therefore, even if the voltage of the battery drops, the operability of the electric equipment does not deteriorate.

According to a sixth aspect of the present invention, a battery-driven electric equipment includes a detector for detecting a voltage of the battery, a display for displaying an image, and a controller for controlling a use of the display based on the voltage detected by the detector.

With this electric equipment, in a case where the voltage of the battery drops, it is possible to prohibit the use of the display, resulting in decreased power consumption.

According to a seventh aspect of the present invention, a battery-driven electric equipment includes a detector for detecting a voltage of the battery, a first dynamic RAM for storing an image, a display for displaying the image, a second dynamic RAM for displaying the image stored in the first dynamic RAM on the display, and a controller for controlling a power supply from the battery to the second dynamic RAM based on the voltage detected by the detector.

With this electric equipment, in a case where the voltage of the battery drops, it is possible to prohibit the use of the dynamic RAM, resulting in decreased power consumption.

According to an eighth aspect of the present invention, a battery-driven electric equipment includes a detector for detecting a voltage of the battery, a focusing lens, a zoom lens, an automatic focusing mechanism for automatically adjusting a focus of the focusing lens, a discrimination unit for discriminating whether or not a use of the automatic focusing mechanism should be prohibited based on the voltage detected by the detector, an indicator for indicating that it is possible to manually adjust the focus of the focusing lens when the discrimination unit discriminates that the use of the automatic focusing mechanism should be prohibited, and a driver for driving the zoom lens to a predetermined position when the discrimination unit discriminates that the use of the automatic focusing mechanism should be prohibited.

With this electric equipment, in a case where it became impossible to use the automatic focusing mechanism because of the dropped voltage of the battery, it is possible to display on the indicator that the mode is a manual focus mode and to set the zoom lens to a predetermined position.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

An embodiment of a digital camera according to the present invention will be explained with reference to the drawings.

As shown in FIGS. 1–5, the digital camera 1 comprises a box-shaped camera main body 2 and an image sensing unit 3 having an elongated rectangular parallelepiped shape. The image sensing unit 3 (surrounded by a thick line) is detachably connected to the right side of the camera main body 2 when seen from the front side.

The image sensing unit 3 includes a main image sensing unit 3A and a connecting portion 3B for connecting the main image sensing unit 3A to the camera main body 2. The image sensing unit 3A has a height almost the same as that of the main body 2 and a width slightly larger than that of the camera main body 2. On one side surface of the image sensing unit 3A, the connecting portion 3B is provided.

Figure 1:
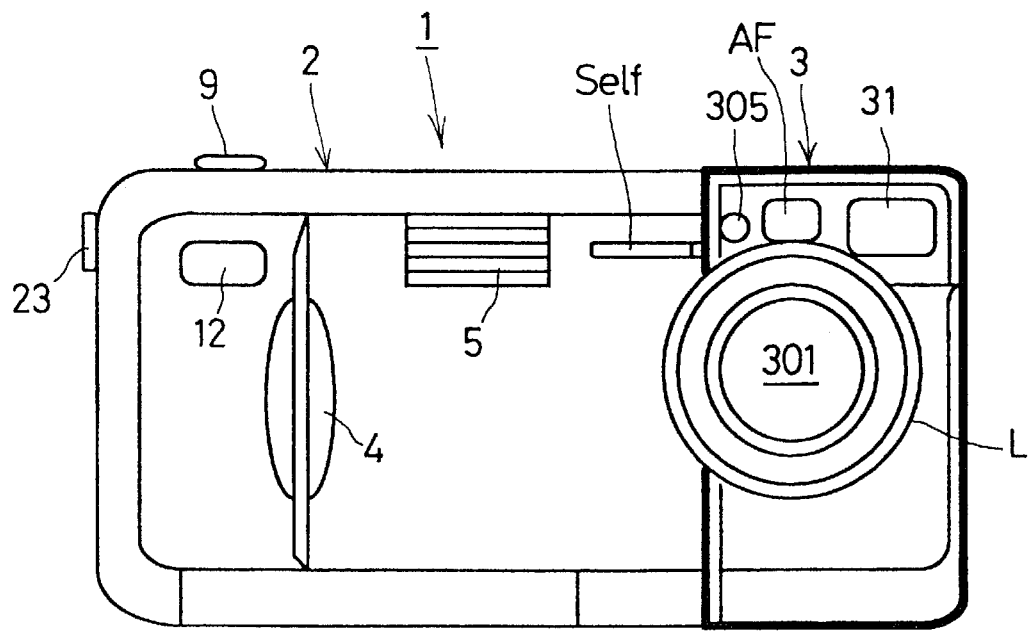
FIG. 1 is a front view of a digital camera according to an embodiment of the present invention.

As shown in FIG. 1, The image sensing unit 3 is provided with a macrozoom lens 301 as a photographing lens. At an appropriate portion behind the macrozoom lens 301, an image pick-up circuit 302 including a CCD color area sensor 303 (see FIG. 6) is disposed. In the image sensing unit 3, similar to a silver halide lens shutter camera, a light-quantity adjusting circuit 304 (see FIG. 6) connected to a light-adjusting sensor 305 for receiving the light of the flash reflected from the object, is provided at an appropriate position. Also, provided at the image sensing unit are a distance measuring sensor AF for measuring the distance to the object and an optical finder 31.

Figure 6:
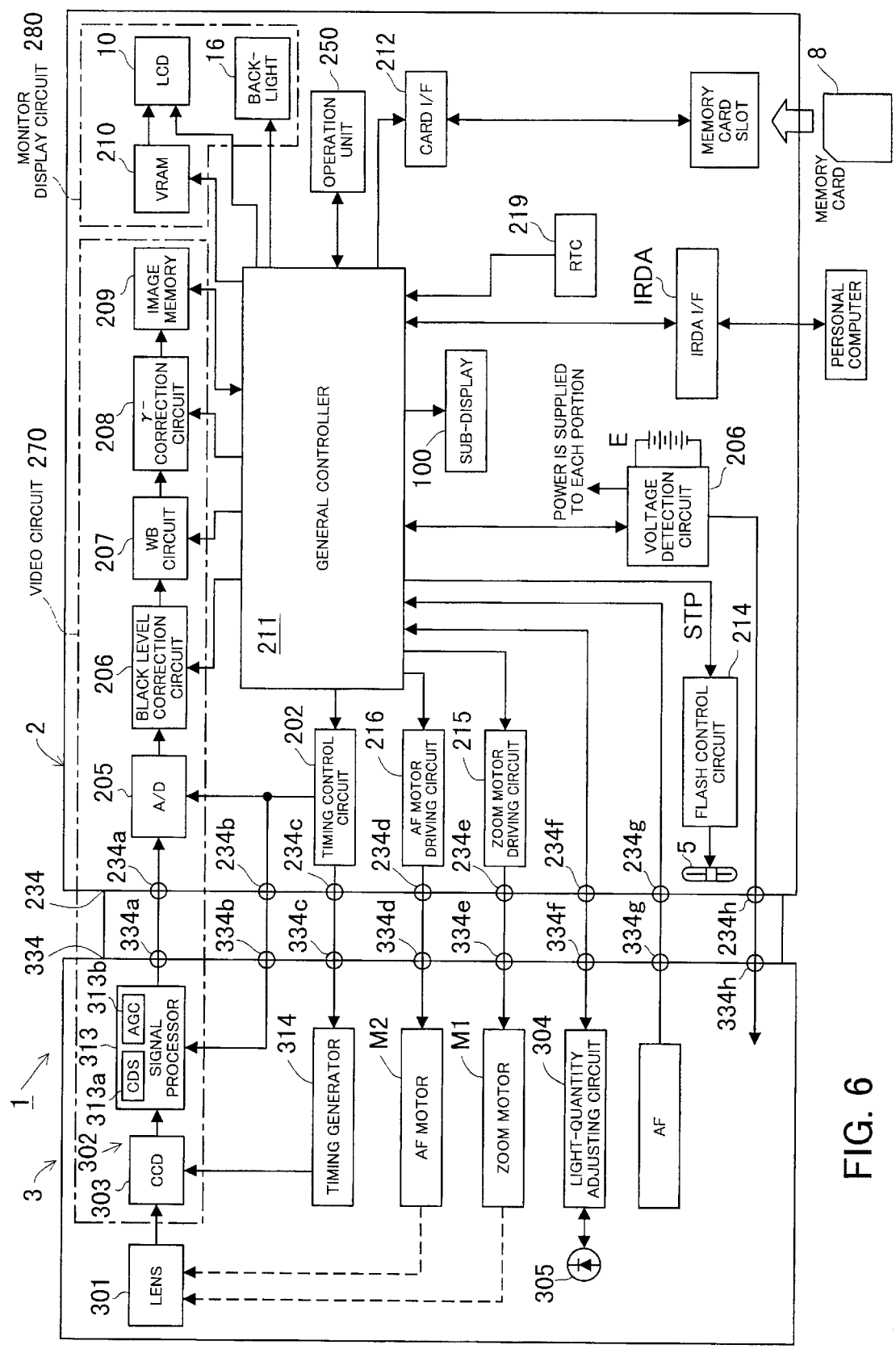
FIG. 6 is a block diagram showing a control system of the digital camera shown in FIGS. 1–5.

Furthermore, as shown in FIG. 6, provided in the image sensing unit 3 are a zoom motor M1 for changing the zoom ratio of the zoom lens 301 and for moving the zoom lens between the stand-by position and the image taking position and an automatic focusing motor (AF motor) M2 for automatically focusing the optical image of the object. The image sensing unit 3 is provided with a helicoid ring L including a helicoid mechanism (not shown) for manually advancing or retreating the photographing lens 301.

A grip 4 is formed in the left-hand side of the front face of the camera main body 2, and a built-in flash lamp 5 is provided in the central upper side of the front face of the camera main body 2. A self-timer lamp Self is provided at the right upper side of the front face of the camera main body. The left upper portion of the grip 4, an IRDA port 12 for infrared-ray communication between the digital camera 1 and an external apparatus such as another digital camera or a personal computer. A shutter button 9 is provided on the top face of the camera main body 2.

Figure 2:
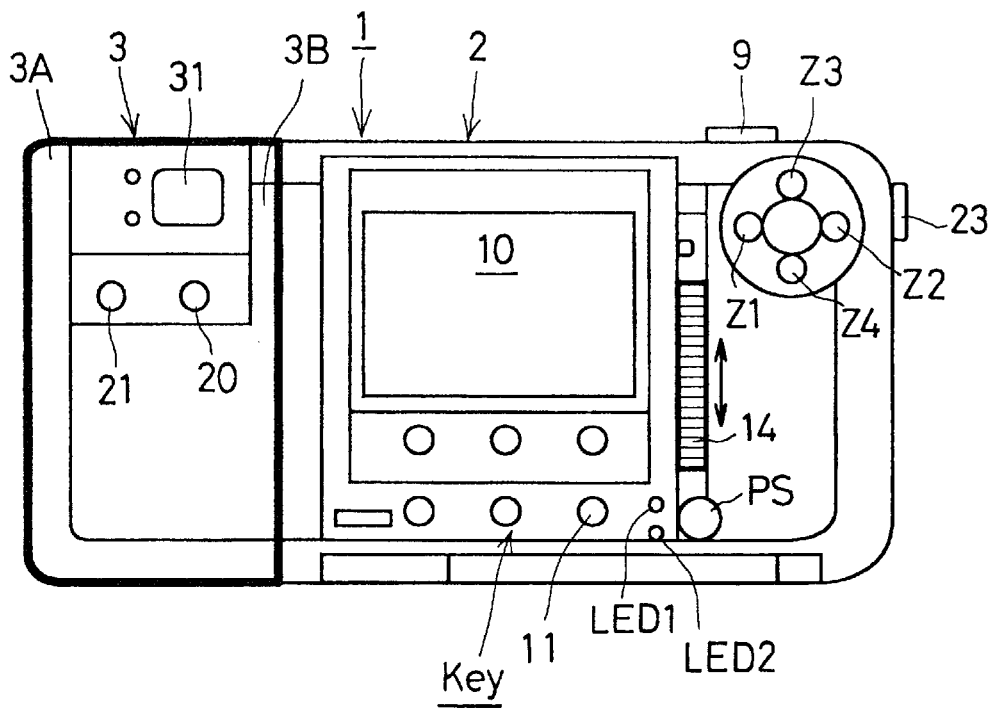
FIG. 2 is a rear view of the digital camera.

As shown in FIG. 2, a liquid crystal display (hereinafter referred to as "LCD") 10 is provided in the middle of the rear face of the camera main body 2 for monitoring the photographed image (corresponding to a view finder) and reproducing the recorded image. Provided at the lower side of the LCD 10 is key switches key for operating the digital camera such as a flash lamp (which may be abbreviated as "FL") mode setting switch 11 and a power switch PS. Provided at the left side of the power switch PS are a display lamp LED1 made of a light emission diode (hereinafter referred to as "LED") which turns on when the power is in a turn-on state and a display lamp LED2 which turns on when a memory card is being accessed.

A photographing/reproduction mode setting switch 14 for switching between a "photographing mode" and a "reproduction mode" is provided on the rear face of the main body 2. Digital pictures are taken in the photographing mode. In the reproduction mode, the digital images recorded in the memory card 8 are reproduced and displayed on the LCD 10. The photographing/reproduction mode setting switch 14 is a bicontact slide switch. For example, if the switch is shifted downward, the reproduction mode is selected, and if shifted upward, the photographing mode is selected.

Provided at the right side of the rear face of the camera main body 2 is a four-gathered switch Z. The four-gathered switch Z includes a zooming button Z1 for zooming out the image (wide direction), a zooming button Z2 for zooming in the image (tele direction), an exposure correction button Z3 for increasing the exposure and an exposure correction button Z4 for decreasing the exposure. By pressing the zooming button Z1 or the zooming button Z2, a general controller 211, which will be explained later, drives the zoom motor M1 by way of the zoom motor driving circuit 215 so as to move a part of the image taking lens 301 to change the focal length while keeping the focusing state.

The flash lamp of the digital camera 1 has an "automatic flash mode," a "forcible flash mode," and a "flash prohibition mode." In the "automatic flash mode," the built-in flash lamp 5 is automatically flashed according to the luminance of the object. In the "forcible flash mode," the built-in flash lamp 5 is forcibly flashed regardless of the luminance of the object. In the "flash prohibition mode," light emission of the built-in flash lamp 5 is prohibited. Every time the user presses the FL mode setting switch 11 positioned below the LCD 10, the flash mode is switched among three modes in a cyclic order.

At the rear face of the image sensing unit 31 as shown in FIG. 2, a LCD switch 20 for turning on/off the power supply to the back-light 16 (see FIG. 6) and a macro switch 21 for starting/stopping a macro photographing are provided.

Every time the user presses the LCD switch 20, the on-off state of the LCD 10 is switched between two states by turns. For example, if the user takes an image by utilizing only the optical finder 31, the LCD 10 is turned off for the purpose of saving the power. The digital camera 1 is capable of taking a macro image by pressing the aforementioned macro switch 21. By pressing the macro switch 21, the focus motor M2 is driven so that the image taking lens 301 can take a macro image.

Figure 3:
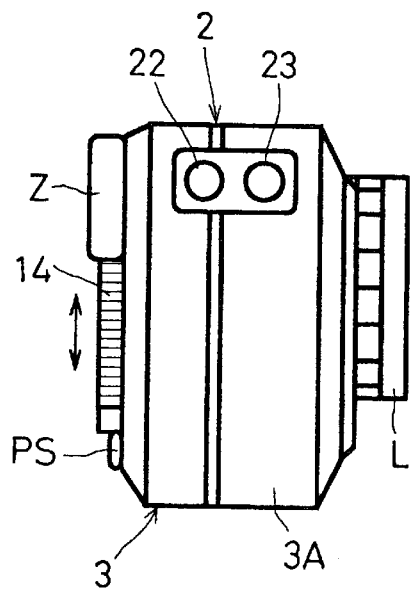
FIG. 3 is a side of the digital camera.

As shown in FIG. 3, provided at the side face of the camera main body 2 opposite to the image sensing unit 3 are a DC (direct current) input terminal 22 and a video output terminal 23 for outputting the displayed contents on the LCD 10 to an external video monitor.

Figure 4:
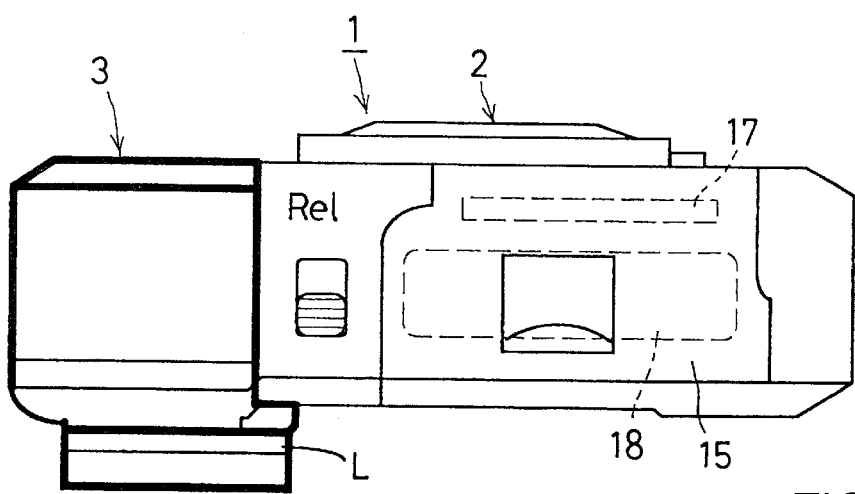
FIG. 4 is a bottom view of the digital camera.

As shown in FIG. 4, a battery cavity 18 and a slot 17 for receiving a memory card 8 are provided on the bottom face of the main body 2. The battery cavity 18 and the slot 17 are covered with a clamshell type cover 15. The digital camera 1 according to this embodiment has a power supply source E consisting of four AA batteries connected in series. Provided at the bottom face of the camera main body 2 is a releasing lever Rel for releasing the engagement between the image sensing unit 3 and the camera main body 2 connected with each other via connectors and hook-shaped engaging members.

Figure 5:
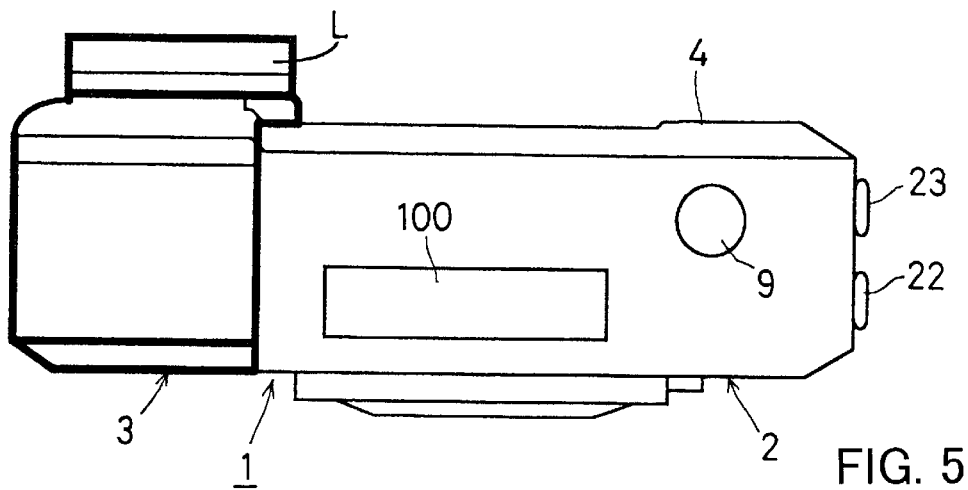
FIG. 5 is a top view of the digital camera.

At the upper side of the camera main body 2, as shown in FIG. 5, a shutter button 9 and a sub-display 100 different from the aforementioned LCD 10 are provided. The sub-display 100 is made of a binary reflection-type liquid crystal which consumes less driving power, and driven by a button cell (not shown) different from a battery for driving the digital camera 1. As will be described later, the sub-display 100 displays the selected reproduction mode/photographing mode, the focus mode, the zoom position, the flash status, the available capacity of the memory card for recording photographed images(remaining available frame numbers), the battery consumption rate, the possible photographing number depending on the battery consumption rate, the available photographing number without changing the battery, warning displays, and the like. These information displays will be updated by the general controller 211 which will be mentioned later.

FIG. 6 is a block diagram of the control system of the digital camera 1.

First, the inner structure of the image sensing unit 3 will be explained. In the image sensing unit 3, the CCD 303 photoelectrically converts the optical image of the object focused by the macrozoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the image sensing unit 3 is fixed, the exposure of the image sensing unit 3 is controlled by adjusting the quantity of exposure of the CCD 303, that is, the charge accumulation time of the CCD 303, which corresponds to the shutter speed. If the luminance of the object is too low to select to an appropriate shutter speed, the level of the image signal output from the CCD 303 is adjusted in order to compensate for the insufficient exposure. In other words, at low luminance, the exposure is controlled by adjusting both the shutter speed and the gain. The level of the image signal is adjusted by controlling the gain of the AGC circuit 313b in the signal processor 313. For example, at the low luminance scene when the light emission of the flash lamp 5 is prohibited for saving power due to the consumed battery, the gain of the AGC circuit 313b is controlled to be increased.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These signals are supplied to the CCD 303.

The signal processor 313 applies a prescribed analogue signal processing to the analog image signal output from the CCD 303. The signal processor 313 has a CDS (correlation double sampling) circuit 313a for reducing the noise of the image signal and an AGC (automatic gain control) circuit 313b for adjusting the level of the image signal by controlling the gain of this AGC circuit.

The light-quantity adjusting circuit 304 sets the light emission of the built-in flash lamp 5 to a predetermined level determined by the general controller 211 when the flash lamp 5 is used when taking an image. During the flash photographing, the flash light reflected from the object is received by the light-adjusting sensor 305 upon starting exposure. When the quantity of light received by the sensor 305 reaches a predetermined level, the light-quantity adjusting circuit 304 supplies a flash stop signal STP to the flash control circuit 214 via the general controller 211. In response to the flash stop signal STP, the flash control circuit 214 forcibly stops the light emission of the built-in flash lamp 5, whereby the light emission amount of the built-in flash lamp 5 can be regulated to the prescribed level.

The aforementioned image sensing unit 3 and the camera main body 2 are electrically connected each other by way of eight groups of connection terminals 334a, 334b, 334c, 334d, 334e, 334f, 334g, 334h provided at the connection surface 334 of the image sensing unit 3 and eight groups of connection terminals 234a, 234b, 234c, 234d, 234e, 234f, 234g, 234h provided at the connection surface 234 of the camera main body 2.

Next, the inner structure of the camera main body 2 will be explained. The A/D converter 205 provided in the main body 2 of the digital camera 1 converts each pixel signal (i.e., analog signal) of the image signal sequence into a 10-bit digital signal based on the A/D conversion clock supplied from the timing control circuit 202.

The timing control circuit 202 generates a reference clock and a clock for the timing generator 314 and the A/D converter, and is controlled by the general controller 211.

A black level correction circuit 206 corrects the black level of the digitalized pixel signal (hereinafter referred to as "pixel data") converted by the A/D converter 205 to the reference black level. A white balance circuit (hereinafter referred to as "WB circuit") 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (the slope of the characteristic line) for each color component in the level conversion table is set each taken image by the general controller 211.

The γ (gamma) correction circuit 208 corrects for the γ (gamma) characteristic of the pixel data. An image memory 209 stores the pixel data output from the γ (gamma) correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the image memory 209.

A VRAM 210 is a buffer memory for storing the image data which is to be reproduced and displayed on the LCD 10. The memory capacity of the VRAM 210 corresponds to the number of pixels of the LCD 10. Each of the image memory 209 and the VRAM 210 is comprised of a DRAM (Dynamic RAM), and the image memory 209 corresponds to the first dynamic RAM and the VRAM 210 corresponds to the second dynamic RAM.

In the image taking preparation mode, each pixel data of the image taken by the image sensing unit 3 every 1/30 second is subjected to the prescribed signal processing by the sequence from the A/D converter 205 to the γ (gamma) correction circuit 208, and stored in the image memory 209. This pixel data is simultaneously transferred to the VRAM 210 via the general controller 211, and displayed on the LCD 10. The user can recognize the photographed object on the LCD 10. In the reproduction mode, the image read out from the memory card 8 is subjected to the prescribed signal processing by the general controller 211, which is then transferred to the VRAM 210, and displayed on the LCD 10.

In this specification, the CCD 303, the signal processor 313, the A/D converter 205, the black level correction circuit 206, the WB circuit 207, γ (gamma) correction circuit 208, the image memory 209 are generally called as a video circuit 270. The VRAM 210, the back light 16 and the LCD 10 are generally called as a monitor display circuit 280. The power supply to the video circuit 270 and the monitor display circuit 280 will be cut-off by operating the LCD switch 20 so as to turn off the LCD 10 at the photographing mode, and by an automatic video-off processing.

The automatic video-off processing is a turning off processing of the power supply from the power source battery E to the video circuit 270 or the monitor display circuit 280 for the purpose of saving the power when the digital camera 1 has not been operated for a predetermined time period. The predetermined time period is determined depending on the remaining power of the power source battery E.

At the photographing mode, if the automatic video-off processing or the turning-off operation of the LCD switch 20 is performed, the power supply to the video circuit 270 or the monitor display circuit 280 will be turned-off. On the other hand, at the reproduction mode, if the automatic video-off processing or the turning-off operation of the LCD switch 20 is performed, only the power supply to the monitor display circuit 280 will be turned-off since the power supply to the video circuit has been already turned-off. At the photographing mode, by pressing the LCD switch 20 after the execution of the automatic video-off processing, the power supply to the video circuit 270 and the monitor display circuit 280 will be resumed if the battery voltage is equal to or more than the predetermined voltage, and the live-view image at the photographing standby mode will be displayed on the LCD 10.

On the other hand, at the reproduction mode, by pressing the LCD switch 20 after the execution of the automatic video-off processing, the power supply to the monitor display circuit 280 will be resumed if the battery voltage is equal to or more than the predetermined voltage, and the reproduced image will be displayed on the LCD 10. As mentioned above, since the automatic video-off processing is a processing for turning off the power supply to a limited circuit such as the video circuit 270 or the monitor display circuit 280, the automatic video-off processing has a merit such that the resume time is shorter than that of the automatic power-off processing which automatically turns off the whole power source of the digital camera 1 if the digital camera has not been operated for a predetermined time period.

In this embodiment, not only the aforementioned automatic video-off processing but also the automatic power-off processing are to be executed. By setting a non-operation time period for the automatic power-off processing to be longer than that for the automatic video-off processing, after the execution of the automatic video-off processing, if the digital camera 1 is not operated, then the automatic power-off processing will be executed.

A card I/F 212 is an interface for writing the image data into the memory card 8 or reading the image data from the memory card 8. An IRDA is an interface for an infrared-ray communication between the digital camera 1 and an external apparatus.

A flash control circuit 214 controls the light emission of the built-in flash lamp 5. In particular, the flash control circuit 214 controls the quantity of flash light, the flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown) for driving the sub-display 100.

A voltage detection circuit 260 detects the voltage of the power source battery E every certain period, and send the detected result to the general controller 211. The general controller 211 controls the camera main body 2 and the image sensing unit 3 depending on the detected voltage. Since the voltage detection circuit 260 also has a switching function and the electric power is supplied to each portion of the camera main body 2 and the image sensing unit 3 by way of the voltage detection circuit 260, it is possible to turn on or off each function block.

An AF motor driving circuit 216 drives an AF motor M2 equipped in the image sensing unit 3, and a zoom motor driving circuit 215 drives a zoom motor M1.

An operation unit 250 includes various switches such as the aforementioned FL mode setting switch 11, the LCD switch 20, the macro switch 21, the photographing/reproduction mode setting switch 14, the four-gathered switch Z and the switch group Key.

The shutter button 9 is a two-step type switch which is generally used in a silver halide camera and can detect the half-pressed state (S1) and the full-pressed state (S2). At the photographing standby state, if the shutter button 9 is half-pressed (S1 state), the distance information obtained from a distance measuring sensor AF is input to the general controller 211. The general controller 211 controls the driving of the automatic focus motor M2 by way of the AF motor driving circuit 216 to move the photographing lens 301 to the focus position. However, in this embodiment, if the voltage of the power source battery E is equal to or less than the predetermined value, the power supply from the power source battery E to the automatic focus motor M2 will be turned off to suspend the automatic focusing function.

The general controller 211 comprises a micro computer, and it organically controls the driving timing of each element in the image sensing unit 3 and the camera main body 2 so as to generally control the photographing operation of the digital camera 1.

The general controller 211 has a luminance detector for determining an exposure control value (i.e., a shutter speed (SS)), and a shutter speed setting unit.

In the image taking standby mode, the luminance detector detects the luminance of the object based on the image taken by the CCD 303 every 1/30 second. In other words, the luminance detector determines the luminance of the object from the image data updated and stored in the image memory 209.

The shutter speed setting unit determines the shutter speed SS (that is, the integral time of the CCD 303) based on the luminance of the object detected by the luminance detector.

The general controller 211 has a filter for filtering the photographed image and a recording image generator for generating a thumb nail image and a compressed image for recording the photographed image. Further provided to the general controller 211 is a reproduction image generator for generating a reproduction image for reproducing images recorded in the memory card 8 on the LCD 10.

The filter corrects the high frequency components of the image to be recorded by a digital filer to correct the contour of the image.

The recording image generator reads the pixel data out of the image memory 209, and generates a thumb nail image and a compressed image which are to be recorded in the memory card 8. To be more precise, the recording image generator scans the image memory 209 in the raster direction, and reads out every 8 pixels in both the horizontal and vertical directions to create a thumb nail image and record the thumb nail image. The recording image generator also reads out the entire pixel data from the image memory 209, and applies a prescribed data compression based on a JPEG method, such as two-dimensional DCT conversion or Huffman coding, to create a compressed image data. The compressed image data is recorded in the primary image area of the memory card 8.

If, in the image taking mode, the shutter button 9 is pressed to start taking images, the general controller 211 creates a thumb nail image from the image taken in the image memory 209 after the instruction for taking images, and the compressed image created by a JPEG method at the compression rate set by the compression rate setting switch 12. Tag information (such as the frame number, exposure value, shutter speed, compression rate, date and time, flash ON/OFF data, scene information, a judged result of the image, etc.), the compressed image and the thumb nail image, are stored in the memory card 8.

Each of the frames of the memory card 8 has tag information, high-resolution image data (1600×1200 pixels) compressed by a JPEG method, and thumb nail image data (80×60 pixels).

When the photographing/reproduction mode setting switch 14 is set to the reproduction mode, the image data having the largest flame number is read out of the memory card 8. The read out image data is extended, and transferred to the VRAM 210 so that the image data having the largest flame number, or the newest photographed image is displayed on the LCD 10. By operating the switch group Key, it is possible to selectively display any one of the frames.

Next, the control of the digital camera according to the illustrated embodiment will be explained with reference to the flow chart shown in FIGS. 7–9. In the following explanation and the drawings, the Step is abbreviated as "S."

Figure 7:
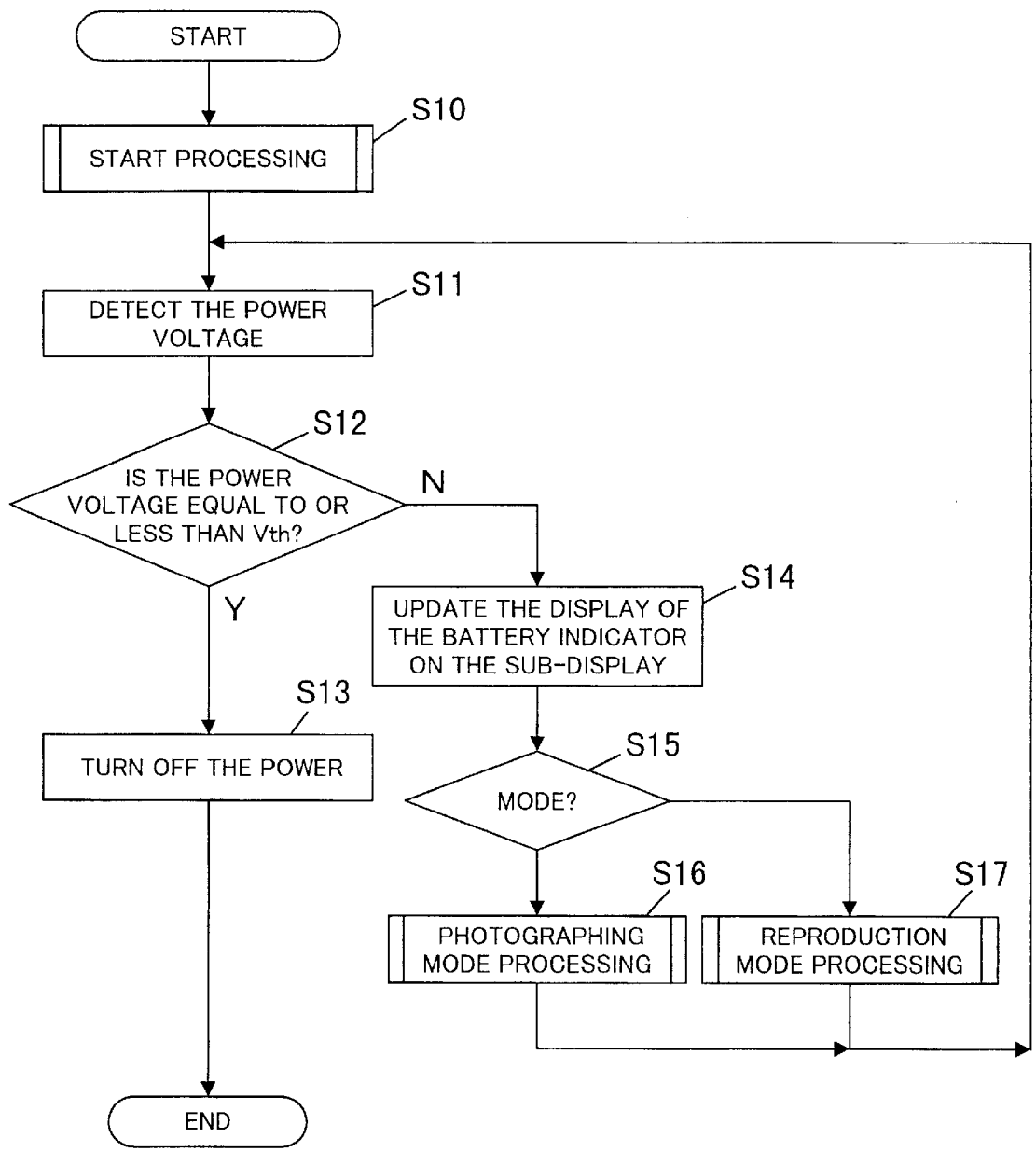
FIG. 7 is a flow chart showing the operation of the digital camera shown in FIGS. 1–6.

FIG. 7 illustrates a flow chart showing a main routine.

In FIG. 7, when the power switch PS is pressed, each component is initialized in S10. In S11, the voltage detection circuit 260 detects the voltage V of the power source battery E.

Next, in S12, it is judged whether or not the detected voltage V is equal to or less than the battery check voltage Vth (in this embodiment Vth=3.8 V). If the detected voltage V is equal to or less than Vth (Yes in S12), since the battery is in a fully consumed state, the power is turned off in S13 to suspend the power supply from the battery E to each portion. If the voltage V of the power source battery E is larger than Vth (No in S11), in S14, the display of the battery indicator of the sub-display 100 is updated so as to correspond to the voltage V detected in S11, and the routine proceeds to S15. As shown in D1 to D7 of FIGS. 10 and 11, the battery indicator 101 of a sub-display 100 is formed to have a shape of a battery for visually showing the remaining power of the power source battery E. For example, if the voltage of the power source battery E is 6 V, the inside display portion of the indicator 101 is fully filled with a black colored scale from the left end to the right end thereof. On the other hand, if the voltage of the power source battery E is equal to Vth (3.8 V), no black colored scale appears in the inside display portion. Thus, the user can grasp the remaining power by the length of the black colored scale.

Next, in S15, it is judged if the mode is a photographing mode or a reproduction mode based on the selection of the mode selection switch 14. If the photographing mode is set, the photographing mode processing is executed in S16, and if the reproduction mode is set, the reproduction mode processing is executed in S17. After either of the mode processing, the process returns to S11 to detect the voltage V of the power source battery E again.

As it is apparent from the above, the voltage of the power source battery E is surely detected in each one loop of the main routine. Therefore, if the voltage V comes equal to or less than Vth, the power turn-off processing is executed immediately, so as to cope with a sudden voltage drop of the power source battery E. If the voltage of the power source battery E is larger than Vth, the display of the remaining power of the power source battery E is updated and displayed, whereby the user can timely confirm the remaining power of the power source battery E.

Figure 8:
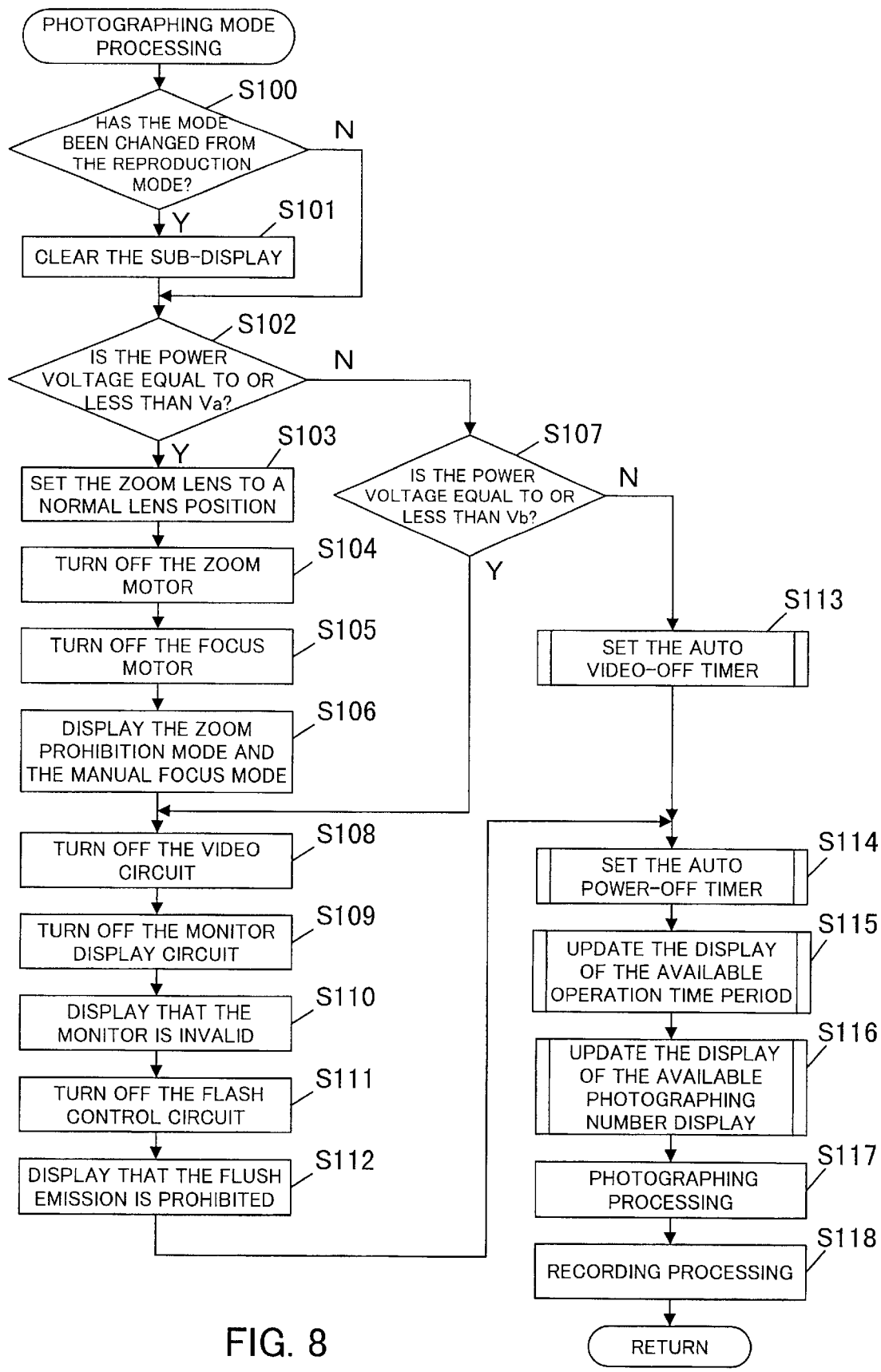
FIG. 8 is a flow chart showing a photographing mode processing in FIG. 7.

FIG. 8 is a flow chart regarding the photographing mode.

Figure 11A:
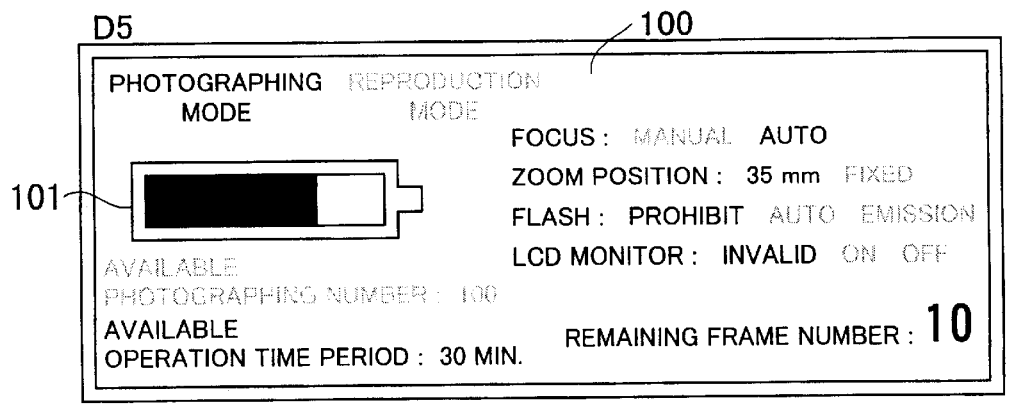
FIG. 11 also illustrates a screen of the sub-display.
Figure 11B:
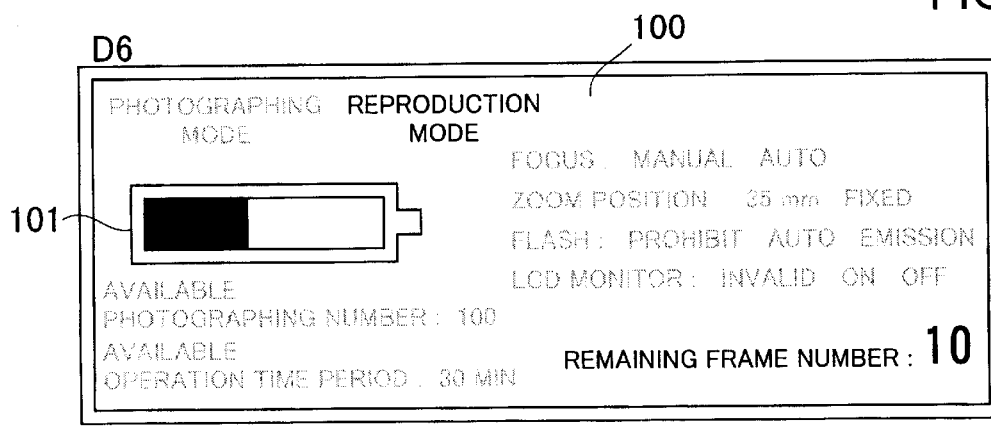
Figure 11C:
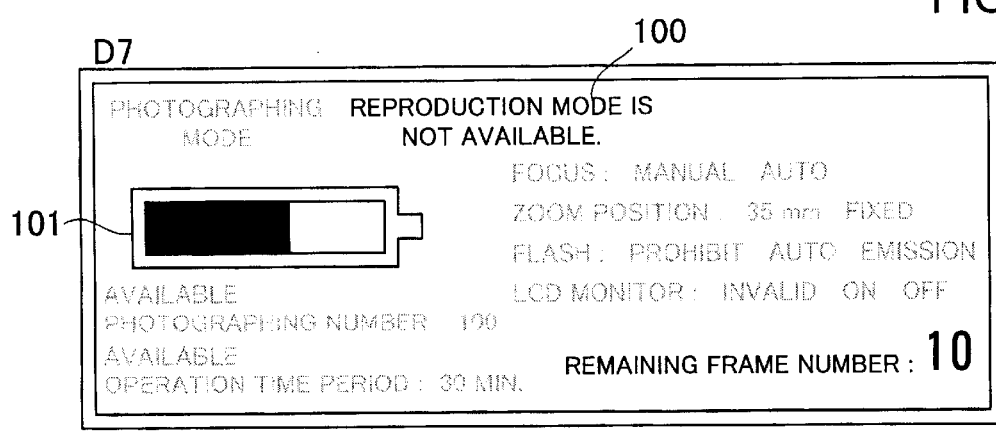
Figure 12:
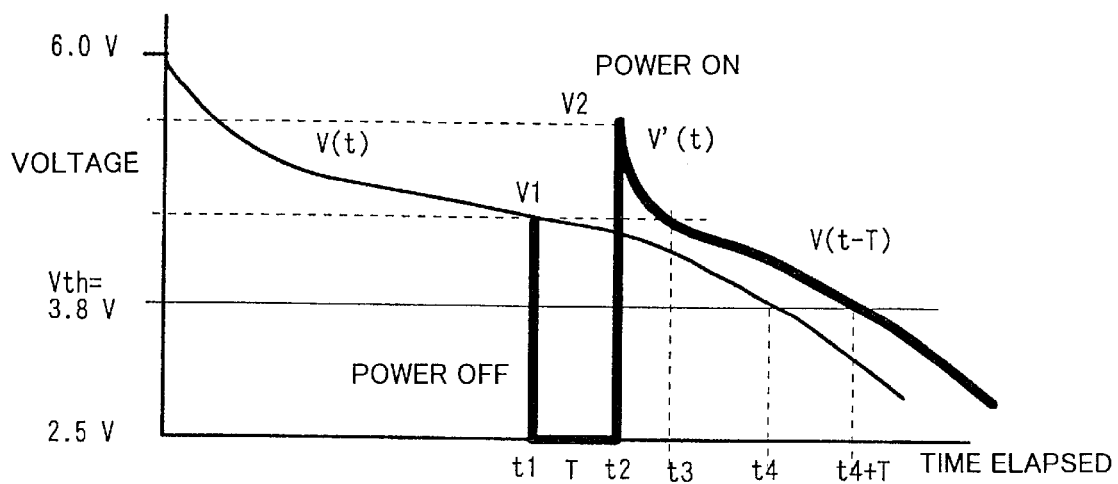
FIG. 12 illustrates a discharging characteristic of a battery for use in a digital camera.

First, in S100, it is judged whether or not the mode has been changed from the reproduction mode to the photographing mode. If the mode has been changed from the reproduction mode to the photographing mode (Yes in S100), the display status of the sub-display 100 is cleared once in S101, and the routine proceeds to S102. At this time, as shown in D1 of FIG. 10, the sub-display 100 only displays the photographing mode, the battery indicator 101 and the remaining frame number. In FIGS. 10 and 11, except for the battery indicator 101, the displayed portion is shown by an actual thick line and the non-displayed portion is shown by a broken thin line. If the mode has not been changed from the reproduction mode to the photographing mode (No in S100), the routine proceeds to S102 because the display of the sub-display 100 should be maintained.

In S102, it is judged whether or not the voltage V of the power source battery E is equal to or less than Va (in this embodiment Va=4.2 V). If Va is equal to or less than Va (Yes in S102), the zoom lens is set to a position corresponding to a standard lens position in S103, and the power supply from the power source battery E to the zoom lens motor M1 and the focus lens motor M2 is turned off via the voltage detection circuit 260 in S104 and S105, respectively. In S106, the display status of the sub-display 100 is updated, and as shown in D2 of FIG. 10, in addition to the display status of D1 of FIG. 10, the sub-display 101 displays that the focus mode is "manual" and that the zoom position is "50 mm fixed" are displayed, and the routine proceeds to S108. As it is apparent from the above, if the voltage V of the power source battery E is equal to or less than Va, or the remaining power is not enough, the power supply from the power source battery E to the zoom lens motor M1 and the focus lens motor M2 is turned off, which lengthens the life of the power source battery E. Furthermore, the user can easily recognize the prohibition of the use of the automatic focus function and the zooming function by the display of the sub-display 100.

In S102, if the voltage V of the power source battery E is larger than Va (No in S102), it is judged whether or not the voltage V of the power source battery E is equal to or less than Vb (provided Vb<Va; in this embodiment Vb=5.0 V) in S107. If the voltage V of the power source battery E is equal to or less than Vb (Yes in S107), the routine proceeds to S108. As mentioned above, the voltage V of the power source battery E is larger than Va and equal to or less than Vb, since some power remains to some degrees, the power supply to the zoom motor M1 and the focus motor M2 will not be turned off as in S104, S105, and the zoom operation and the automatic focus operation can be freely executed.

Next, in S108, the power supply to the video circuit 270 is turned off, and in S109 the power supply to the monitor display circuit 280 is turned off. In S110, the sub-display 100 displays that the display of the LCD 10 (denoted as "LCD monitor" in FIG. 10) is invalid. In Sill, the power supply to the FL control circuit 214 is turned off, and in S112, the sub-display 100 displays that the flash emission is prohibited.

In other words, if the processes of S103–S106 are performed, or the voltage V of the battery E is equal to or less than Va, as shown in D3 of FIG. 10, in addition to the display status of D1 of FIG. 10, the sub-display 100 displays that the focus mode is "manual," that the zoom position is "50 mm fixed," that the flash mode is "prohibited" and that the LCD monitor is "invalid." On the other hand, if the processes of S103–S106 are not performed, or the voltage V of the battery E is larger than Va, and is equal to or less than Vb, as shown in D4 of FIG. 10, in addition to the display status of D1 of FIG. 10, the sub-display 100 displays that the focus mode is "Auto," that the zoom position is "35 mm," that the flash mode is "prohibited" and that the LCD monitor is "invalid." If the processes of S103–S106 are not performed, since the power supply to the zoom motor M1 and the focus motor M2 is turned off, the display of the selection of the focus mode and the zoom position information in D4 of FIG. 10 changes depending on the status.

In S107, if the voltage V of the power source battery E is larger than Vb (No in S107), the timer value for the automatic video-off processing is set in S113, and the routine proceeds to S114. In this embodiment, as shown below, three staged timer values are set depending on the voltage V of the power source battery E. If these three staged timer values are set, the time period for the automatic video-off processing becomes shorter in accordance with the consumption of the power source battery E. Therefore, the life of the power source battery E can be lengthened effectively. In a case where the voltage V of the power source battery E is equal to or less than Vb (Yes in S107) and the process of from S108 to S112 are performed, since the back light 16 of the LCD 10 is already turned off, the timer value for the automatic video-off processing in S113 will not be set, and the routine proceeds to S114.

TABLE 1

| Voltage V (volt) | Automatic Video-off Timer Value |
|---|---|
| 5.6 < V ≦ 6.0 | 60 seconds |
| 5.3 < V ≦ 5.6 | 45 seconds |
| 5.0 < V ≦ 5.3 | 30 seconds |

In S114, the timer value for the automatic power-off processing is set. In this embodiment, as shown below, five staged timer values are set depending on the voltage V of the power source battery E. If these five staged timer values are set, the time period for the automatic power-off processing becomes shorter in accordance with the consumption of the power source battery E. Therefore, the life of the power source battery E can be lengthened effectively. Furthermore, by combining the aforementioned automatic video-off processing with this automatic power-off processing, first, the power supply from the power source battery E to the video circuit 270 and the monitor display circuit 280 is turned off by the automatic video-off processing. Then, after a certain time period, the power supply from the power source battery E to each portion is turned off by the automatic power-off processing. Therefore, the life of the power source battery E can be lengthened stepwise.

TABLE 2

| Voltage V (volt) | Automatic Power-off Timer Value |
|---|---|
| 5.6 < V ≦ 6.0 | 300 seconds |
| 5.3 < V ≦ 5.6 | 180 seconds |
| 5.0 < V ≦ 5.3 | 60 seconds |
| 4.2 < V ≦ 5.0 | 45 seconds |
| V ≦ 4.2 | 30 seconds |

Subsequently, in S115, the sub-display 100 displays the available operation time period of the digital camera 1 depending on the voltage V of the power source battery E. In other words, every time the voltage V of the power source battery E is detected in S11, the elapsed time t counted from the start and the voltage V(t) at the time are stored in the inner memory of the general controller 211, by which the time period for reaching Vth from the voltage V is predicted. Thus, the predicted time period corresponds to the aforementioned available operation time period. The method for prediction may be a well-known method utilizing a rough calculation by a three-dimensional function and the like. In a rough calculation by a three-dimensional function, a three-dimensional curve of the voltage V(t) is calculated by adapting newest four points, the time of V(t)=Vth is calculated based on the obtained three-dimensional curve V(t). Then, as shown in D5 of the FIG. 11, the obtained time T is displayed on the sub-display 100 as the available operation time period. By pressing the power switch PS, or when the power is turned off by the automatic power-off processing, the available operation time period shown in the sub-display 100 is also reset.

Next, in S116, the sub-display 100 displays an available photographing number depending on the voltage of the power source battery E. This available photographing number shown in the sub-display 100 denotes how many frames can be taken by the remaining power of the power source battery E, and is different from the remaining frame number depending on the available capacity of the memory card 8. This available photographing number correlates with the voltage V of the power source battery E, and is closely represented by the following linear equation:

$$N = N\max(V-V\text{th})/(Vo-V\text{th})$$

wherein N: available photographing number,

Nmax: the maximum number of the available photographing number obtained by an advance test, and Vo: the reference voltage of the power source battery.

For example, provided that Nmax=220, Vo=6.0, the result is shown as follows:

$$N = 100(V-3.8)$$

Since the value of Nmax differs depending on the operation mode of the digital camera such as the on/off state of the flash lamp 5 or the on/off state of the LCD 10, the available photographing number in each operation mode can be displayed by previously obtaining the Nmax value on each operation mode. For example, if it is assumed that the light emission (On) by the flash lamp 5 or the display (On) of the LCD 10 is performed at 50% of the photographing operations, the Nmax value is set to 220/2=110, for example.

By pressing the power switch PS, or when the power is turned off by the automatic power-off processing, the available photographing number appeared on the sub-display 100 will be rest.

As mentioned above, the sub-display 100 displays the photographing mode, the battery indicator, the focus mode, the zoom position information, the flash mode, the LCD monitor, the available photographing number, the available operation time period, and the remaining frame number depending on the voltage V of the power source battery E. Therefore, the user can easily recognize the status of the digital camera 1.

Next, in 117, the photographing processing is executed. When the shutter button 9 is half-pressed (S1), the power is supplied from the power source battery E to the video circuit 270 at the timing of S1, which leads to a photographing available state. By further pressing the shutter button 9 (S2), the recording processing is executed at the timing of S2 (S118). After recording the photographed image into the memory card 8, the routine terminates the photographing processing and returns to S11.

Figure 9:
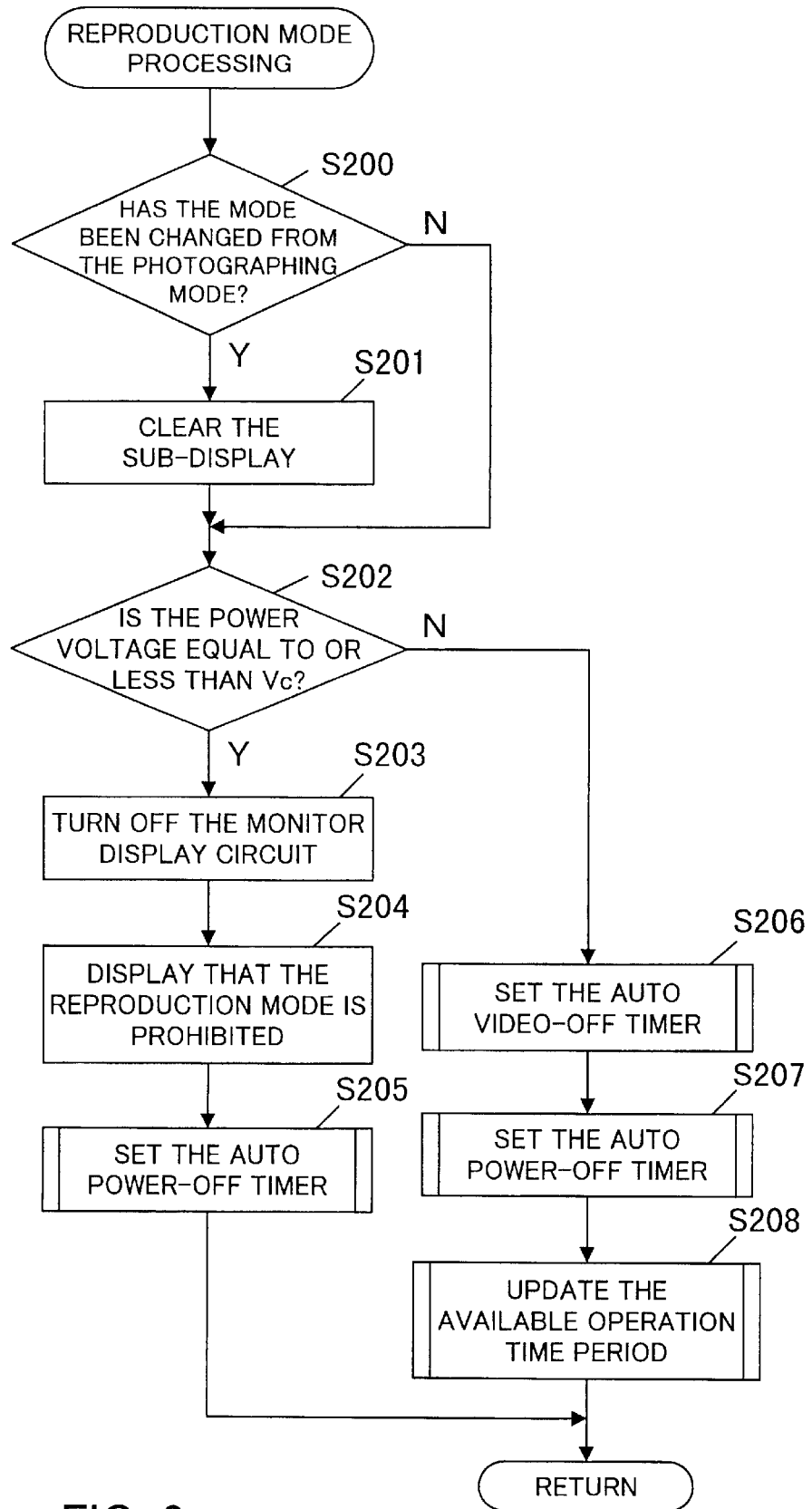
FIG. 9 is a flow chart showing a photographing mode processing in FIG. 7.
Figure 10A:
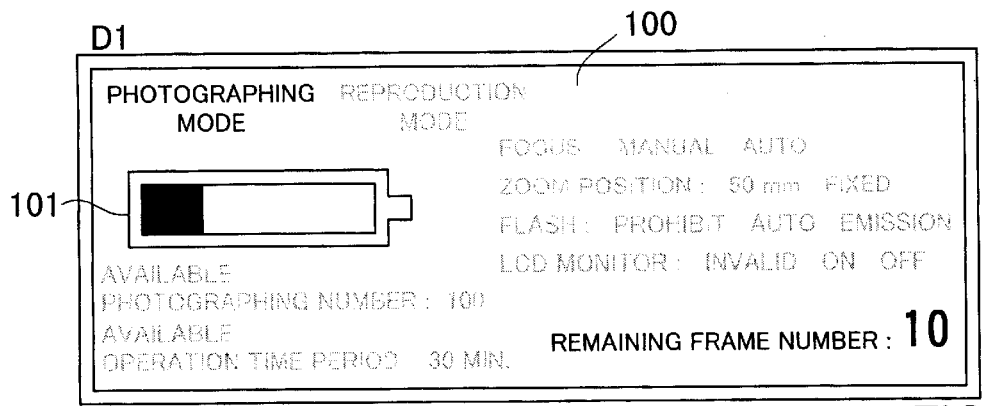
FIG. 10 illustrates a screen of the sub-display.
Figure 10B:
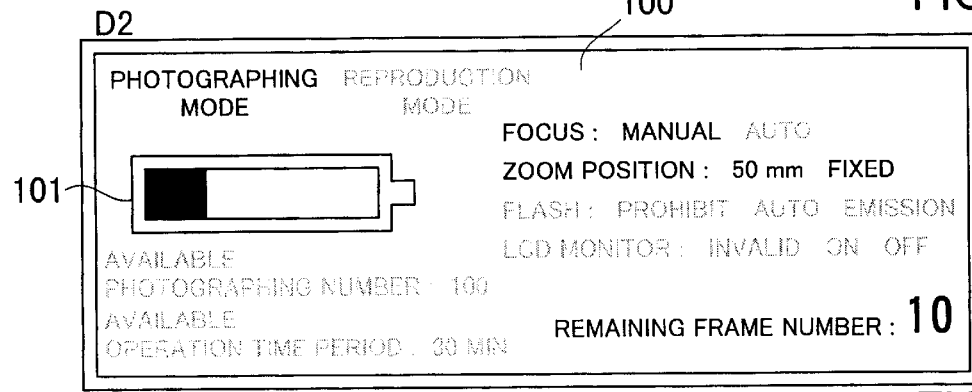
Figure 10C:
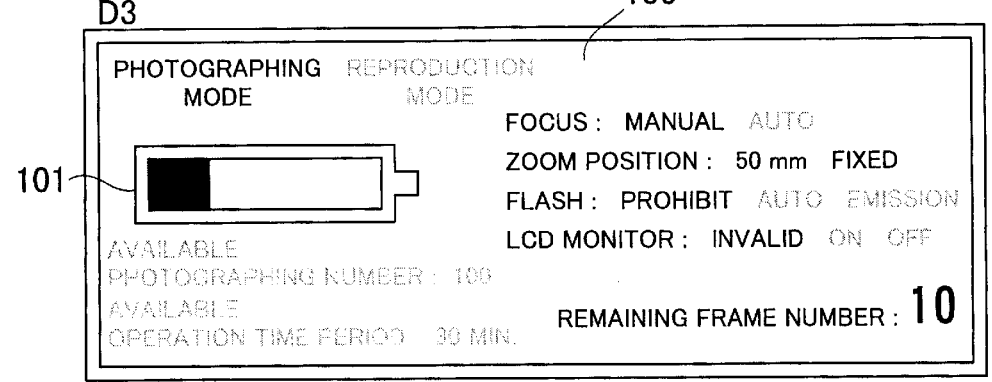
Figure 10D:
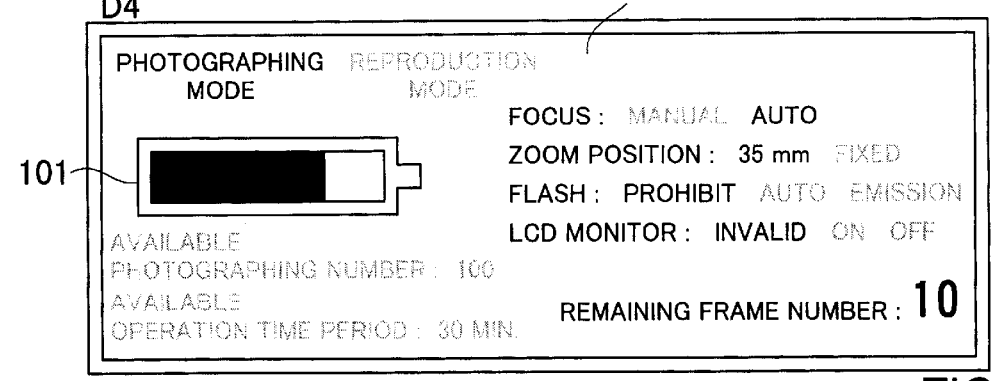

FIG. 9 is a flow chart regarding the reproduction mode processing.

First, in S200, it is judged whether or not the mode has been changed from the photographing mode to the reproduction mode. If the mode has been changed from the photographing mode to the reproduction mode (Yes in S200), the display status of the sub-display 100 is cleared once in S201, and the routine proceeds to S202. At this time, as shown in D6 of FIG. 11, the sub-display 100 only displays the reproduction mode, the battery indicator and the remaining frame number depending on the available capacity of the memory card 8. If the mode has not been changed from the photographing mode to the reproduction mode (No in S200), the routine proceeds to S202.

In S202, it is judged whether or not the voltage V of the power source battery E is equal to or less than Vc (in this embodiment Vc=5.2 V). If the voltage V of the power source battery E is equal to or less than Vc (Yes in S202), the power supply from the power source battery E to the monitor display circuit 280 is turned off in S203 because of the limited remaining power of the power source battery E. Therefore, the power supply to the VRAM 210 is also turned off.

In S204, the display status of the sub-display 100 is updated, and displays warnings that "the reproduction mode is not available," as shown in D7 of FIG. 11. As it is apparent from the above, if the voltage V of the power source battery E is equal to or less than Vc, or the remaining power is not enough, the power supply from the power source battery E to the monitor display circuit 280 is turned off, which lengthens the life of the power source battery E. With regard to the video circuit 270, when the reproduction mode is selected by operating the mode setting switch 14, the power supply from the power source battery E to the video circuit 270 is turned off.

Next, in S205, the timer values are set for the automatic power-off processing since the reproduction prohibit state in S204 may be kept. In this embodiment, as shown below, three staged timer values are set depending on the voltage V of the power source battery E. If these three staged timer values are set, the time period for the automatic power-off processing becomes shorter in accordance with the consumption of the power source battery E. Therefore, the life of the power source battery E can be lengthened effectively.

TABLE 3

| Voltage V (volt) | Automatic Power-off Timer Value |
| --- | --- |
| $5.0 < V \leq 5.2$ | 60 seconds |
| $4.2 < V \leq 5.0$ | 45 seconds |
| $V \leq 4.2$ | 30 seconds |

In a case where the voltage V of the power source battery E is larger than Vc (No in S202), the timer value is set for the automatic video-off processing in S206. In this embodiment, as shown below, three staged timer values are set depending on the voltage V of the power source battery E. If these three staged timer values are set, the time period for the automatic video-off processing becomes shorter in accordance with the consumption of the power source battery E. Therefore, the life of the power source battery E can be lengthened effectively.

TABLE 4

| Voltage V (volt) | Automatic Video-off Timer Value |
| --- | --- |
| $5.6 < V \leq 6.0$ | 60 seconds |
| $5.4 < V \leq 5.6$ | 45 seconds |
| $5.2 < V \leq 5.4$ | 30 seconds |

In a case where the voltage V of the power source battery E is equal to or less than 5.2 V, since the reproduction mode is invalid, the automatic video-off timer is not set.

Next, in S207, the timer value is set for the automatic power-off processing. In this embodiment, as shown below, two staged timer values are set depending on the voltage V of the power source battery E. If these two staged timer values are set, the time period for the automatic video-off processing becomes shorter in accordance with the consumption of the power source battery E. Therefore, the life of the power source battery E can be lengthened effectively. Furthermore, by combining the aforementioned automatic video-off processing with this automatic power-off processing, first, the power supply from the power source battery E to the monitor display circuit 280 is turned off by the automatic video-off processing. Then, after a certain time period, the power supply from the power source battery E to each portion is turned off by the automatic power-off processing. Therefore, the life of the power source battery E can be lengthened stepwise.

TABLE 5

| Voltage V (volt) | Automatic Power-off Timer Value |
| --- | --- |
| $5.6 < V \leq 6.0$ | 300 seconds |
| $5.2 < V \leq 5.6$ | 180 seconds |

Subsequently, in S208, the sub-display 100 displays the available operation time period of the digital camera 1 depending on the voltage V of the power source battery E, and the routine terminates this reproduction mode and returns to S11 to detect the voltage V of the power source battery E again. As in the same manner in the photographing mode, every time the voltage V of the power source battery E is detected in S11, the elapsed time t counted from the start and the voltage V(t) at the time are stored in the inner memory of the general controller 211, by which the time period for reaching Vth from the voltage V is predicted. Thus, the predicted time period corresponds to the aforementioned available operation time period. By pressing the power switch PS, or when the power is turned off by the automatic power-off processing, the available operation time period shown in the sub-display 100 is also reset.

In the above embodiment, a digital camera is shown as an example, however, the present invention is not limited to such a digital camera, but may be applied to any battery-driven (portable) electric equipment such as a PC (personal computer), PDA (Personal Digital Assistance) or a portable telephone with a camera.

According to the aforementioned embodiment, since the available photographing number is set based on the voltage of the battery E detected by the voltage detection circuit 260, and is displayed on the sub-display 100, the user can recognize how long the digital camera can take images. Therefore, even if the voltage of the battery drops, the deterioration of the operability can be prevented.

Furthermore, since the available photographing number is displayed, the user's positive power saving operation by positively turning off the power can be expected, resulting in an enhanced power saving of the battery and a lengthened battery life.

In this case, by setting the available photographing number taking into account of an operation mode such as a flash lamp on/off mode or an LCD on/off mode, the available photographing number in each operation mode can be obtained accurately.

Furthermore, by displaying the available photographing number separately from the photographed image, the available photographing number can be displayed without hindering the display of the photographed image. Thus, the user can easily recognize them.

In a case where the voltage of the battery E is detected periodically, it becomes possible to display the available photographing number in high-accuracy depending on the voltage variation. Thus, the user can grasp the consumption state of the battery precisely.

Furthermore, by changing the non-operation time period for causing the power turn-off, by changing the non-operation time period for causing the power turn-off of the video circuit 270 and the monitor display circuit 280, by deciding whether or not the reproduction mode can be used, or by deciding whether or not the flash lamp 5 can be used, an appropriate operation for preventing the power consumption can be performed depending on the voltage of the battery E, resulting in a lengthened battery life.

Furthermore, in a case where the available operation time period of the equipment is predicted based on the voltage of the driving battery and is displayed, the user can recognize how long the electric equipment can be used, which prevents the deterioration of the operability even if the voltage of the battery drops.

Furthermore, in a case where it is decided based on the voltage of the driving battery E whether or not the LCD 10 can be used, since the use of the LCD 10 is prohibited by turning off the power supply to, for example, the driving circuit for driving the LCD 10 when the voltage of the battery drops, the power consumption can be decreased.

Furthermore, in a case where the power supply to the image memory 209 or the VRAM 210 which are dynamic RAMs is controlled depending on the voltage of the driving battery, the use of these dynamic RAMs can be prohibited when the voltage of the battery drops, resulting in decreased power consumption.

Furthermore, in a case where it is decided whether or not the automatic focusing mechanism is used based on the voltage of the driving battery E, the use of the automatic focusing mechanism can be prohibited, resulting in decreased power consumption.

In this case, the operability can be enhanced by displaying on the sub-display such that the mode is in a manual focus mode when the use of the automatic focusing mechanism is prohibited, or by prohibiting the use of the automatic focusing mechanism and setting the zoom lens to a predetermined position when it is detected that the voltage of the battery is low at the starting time.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A battery-driven electric equipment, comprising:
    an image sensor for photoelectrically converting an optical image of an object;
    a video circuit for processing an output from said image sensor;
    a display for displaying an image processed by said video circuit;
    a manipulation member;
    a discriminator for discriminating whether said manipulation member has not been manipulated for a predetermined time period;
    a first controller for suspending a power supply from said battery to said video circuit and said display when said discriminator discriminates that said manipulation member has not been manipulated for a first time period;
    a second controller for turning off a power supply of said electric equipment when said discriminator discriminates that said manipulation member has not been manipulated for a second time period longer than the first time period; and
    a detector for detecting a voltage of said battery;
    wherein said first controller changes the first time period based on the voltage detected by said detector, and said second controller changes the second time period based on the voltage detected by said detector.

2. A battery-driven electric equipment as in claim 1, wherein said electric equipment is a digital camera.

3. A battery-driven electric equipment as in claim 2, wherein said digital camera further includes a selector for selecting a reproduction mode for reproducing a recorded image and a third controller for controlling a selection of said reproduction mode by said selector based on the voltage detected by said detector.

4. A battery-driven electric equipment as in claim 3, wherein said third controller prohibits the selection of the reproduction mode when the voltage detected by said detector is equal to or less than a predetermined voltage.

5. A battery-driven electric equipment as in claim 2, wherein said digital camera further includes a flash lamp for illuminating the object and a third controller for controlling the use of said flash lamp based on the voltage detected by said detector.

6. A battery-driven electric equipment as in claim 5, wherein said third controller prohibits a use of said flash lamp when the voltage detected by said detector is equal to or less than a predetermined voltage.

7. A battery-driven electric equipment as in claim 6, wherein said digital camera further includes an amplifier for amplifying an output from said image sensor, wherein said third controller increases a gain of said amplifier when the use of said flash lamp is prohibited.

8. A battery-driven electric equipment as in claim 2, wherein said digital camera further includes a calculator for calculating a remaining available operation time period of said digital camera based on the voltage detected by said detector, and an indicator for indicating the available operation time period calculated by said calculator.

9. A battery-driven electric equipment as in claim 2, wherein said digital camera further includes a third controller for controlling a use of said display based on the voltage detected by said detector.

10. A battery-driven electric equipment as in claim 9, wherein said third controller prohibits the use of said display when the voltage detected by said detector is equal to or less than a predetermined voltage.

11. A battery-driven electric equipment as in claim 10, wherein said third controller prohibits the use of said display by suspending a power supply from said battery to a driving circuit for driving said display.

12. A battery-driven electric equipment as in claim 11, wherein said digital camera further includes an optical finder for confirming the object.

13. A battery-driven electric equipment as in claim 2, wherein said digital camera includes a first dynamic RAM for storing an image, a second dynamic RAM for displaying the image stored in said first dynamic RAM on said display, and a third controller for controlling a power supply from said battery to said second dynamic RAM based on the voltage detected by said detector.

14. A battery-driven electric equipment as in claim 13, wherein said third controller suspends a power supply to said second dynamic RAM when the voltage detected by said detector is equal to or less than a predetermined voltage.

15. A battery-driven electric equipment as in claim 2, wherein said digital camera further includes:
    a photographing lens;
    an automatic focusing mechanism for automatically adjusting a focus of said photographing lens;
    a third controller for discriminating whether a use of said automatic focusing mechanism should be prohibited based on the voltage detected by said detector and indicating that it is possible to manually adjust the focus of said photographing lens when it is discriminated that the use of said automatic focusing mechanism should be prohibited; and
    a driver for driving said photographing lens to a predetermined focal length when it is discriminated that the use of said automatic focusing mechanism should be prohibited.

16. A method of controlling a battery-driven electric equipment, the method comprising:

photoelectrically converting an optical image of an object by an image sensor;

processing an output from the image sensor by a video circuit;

displaying an image processed by the video circuit on a display;

discriminating whether a manipulation member has not been manipulated for predetermined time period;

suspending a power supply from the battery to the video circuit and the display when it is discriminated that the manipulation member has not been manipulated for a first time period;

turning off a power supply of the electric equipment when it is discriminated that the manipulation member has not been manipulated for a second time period longer than the first time period;

detecting a voltage of the battery; and changing the first time period and the second time period based on a detected voltage.

17. A method for controlling a battery-driven electric equipment as in claim 16, further comprising a step of controlling a selection of a reproduction mode of said battery-driven electric equipment based on the detected voltage of the battery.

* * * * *

UNITED STATES PATENT AND TRADEMARK OFFICE
CERTIFICATE OF CORRECTION

PATENT NO.     : 6,710,809 B1
DATED          : March 23, 2004
INVENTOR(S)    : Masahito Nikawa It is certified that error appears in the above-identified patent and that said Letters Patent is hereby corrected as shown below:

Column 1,
Line 23, delete "H9(1997)-130649", and insert -- H9 (1997)-130649 --.

Column 4,
Line 53, delete "FIG 1, The", and insert -- FIG 1, the --.

Column 5,
Line 64, delete "unit 31", and insert -- unit 3, --.

Column 6,
Line 61, after "select", delete "to".

Column 7,
Line 37, after "connected", insert -- to --.

Column 10,
Line 58, delete "flame", and insert -- frame --.

Column 12,
Line 20, delete "provided Vb<Va;", and insert -- provided Vb>Va; --.
Line 33, delete "Sill," and insert -- In S111, --.

Column 14,
Line 27, delete "rest", and insert -- reset --.

UNITED STATES PATENT AND TRADEMARK OFFICE
CERTIFICATE OF CORRECTION

PATENT NO. : 6,710,809 B1
DATED : March 23, 2004
INVENTOR(S) : Masahito Nikawa

It is certified that error appears in the above-identified patent and that said Letters Patent is hereby corrected as shown below:

Column 16,
Lines 57 and 58, delete "Furthermore, by changing the non-operation time period for causing the power turn-off, by changing the non-operation time period for causing the power turn-off," and insert -- Furthermore, by changing the non-operation time period for causing the power turn-off --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,710,809 B1
DATED : March 23, 2004
INVENTOR(S) : Masahito Niikawa

It is certified that error appears in the above-identified patent and that said Letters Patent is hereby corrected as shown below:

<u>Column 1</u>,
Line 23, delete "H9(1997)-130649", and insert -- H9 (1997)-130649 --.

<u>Column 4</u>,
Line 53, delete "FIG 1, The", and insert -- FIG 1, the --.

<u>Column 5</u>,
Line 64, delete "unit 31", and insert -- unit 3, --.

<u>Column 6</u>,
Line 61, after "select", delete "to".

<u>Column 7</u>,
Line 37, after "connected", insert -- to --.

<u>Column 10</u>,
Line 58, delete "flame", and insert -- frame --.

<u>Column 12</u>,
Line 20, delete "provided Vb<Va;", and insert -- provided Vb>Va; --.
Line 33, delete "Sill," and insert -- In S111, --.

<u>Column 14</u>,
Line 27, delete "rest", and insert -- reset --.

UNITED STATES PATENT AND TRADEMARK OFFICE
CERTIFICATE OF CORRECTION

PATENT NO. : 6,710,809 B1
DATED : March 23, 2004
INVENTOR(S) : Masahito Niikawa

It is certified that error appears in the above-identified patent and that said Letters Patent is hereby corrected as shown below:

Column 16,
Lines 57 and 58, delete "Furthermore, by changing the non-operation time period for causing the power turn-off, by changing the non-operation time period for causing the power turn-off," and insert -- Furthermore, by changing the non-operation time period for causing the power turn-off --.

This certificate supersedes Certificate of Correction issued July 27, 2004.

Signed and Sealed this

Ninth Day of May, 2006

JON W. DUDAS
*Director of the United States Patent and Trademark Office*